Patented Dec. 7, 1943

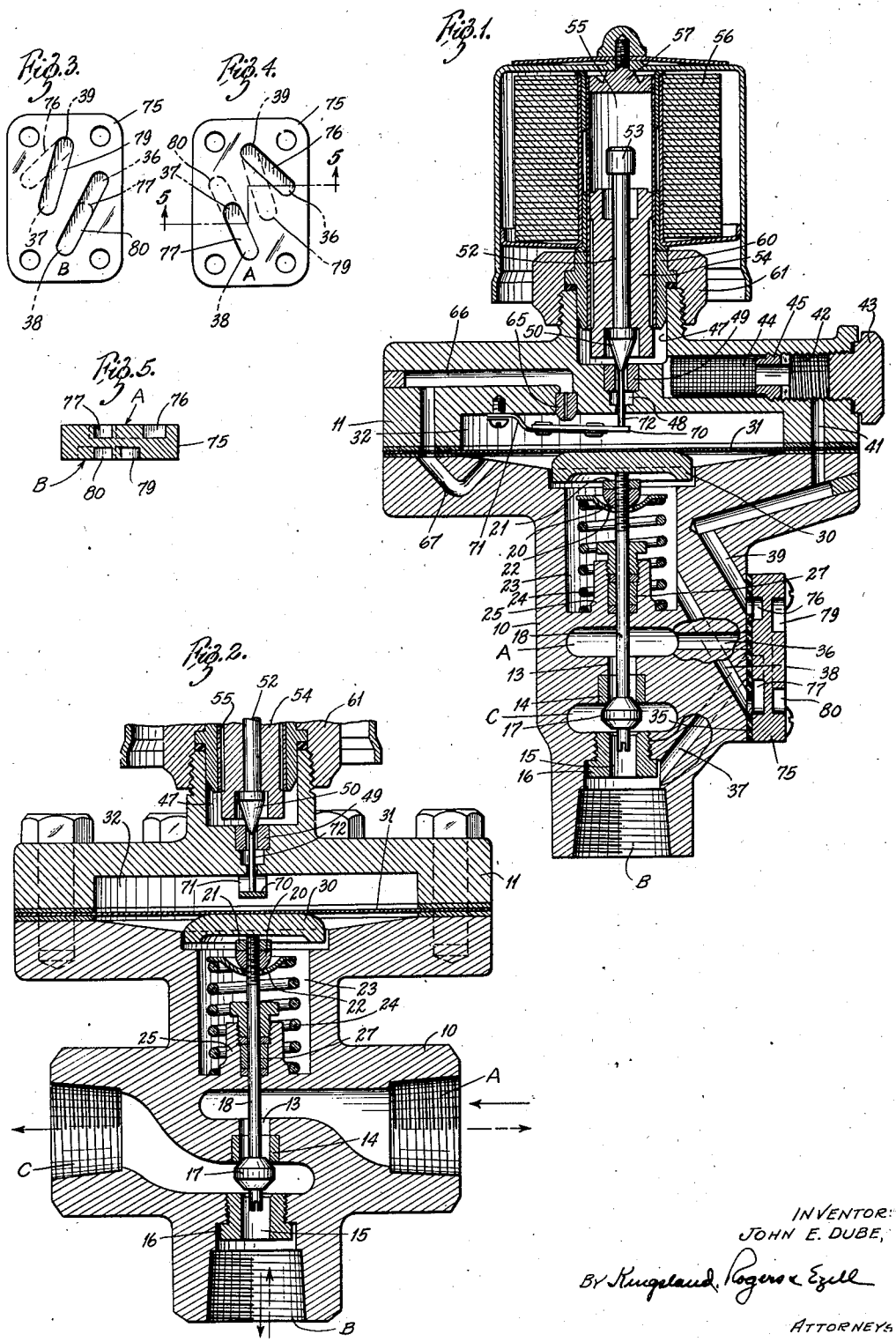

2,335,923

UNITED STATES PATENT OFFICE 2,335,923

THREE-WAY VALVE

John E. Dube, Clayton, Mo., assignor to Alco Valve Company, Maplewood, Mo., a corporation of Missouri Application February 17, 1941, Serial No. 379,193

9 Claims. (Cl. 137—139)

The present invention relates to a valve of the so-called three-way type. It broadly comprises a valve having an automatically operated mechanism, which valve may seat in either one of two positions, together with selector means displaceable to determine the flow through the valve.

More particularly, the valve mechanism comprises three passageways, one of which is an outlet and the other two of which are adapted to be either inlet or exhaust passages, with a valve seat between each inlet passage and the outlet, together with an automatically operated main valve adapted to seat alternately on either seat and to open the other to control the flow from either of said inlet passages to the outlet, and fluid pressure means to operate the main valve, the fluid pressure means being in turn controlled by a pilot valve energized to open and admit fluid under pressure to the fluid pressure means, all combined with a selector means determining the flow pattern of fluid to the pilot valve, in suchwise that when one inlet passage is connected as such, the main valve is opened for it upon energization of the pilot valve, and when the other inlet passage is connected as such, the main valve is opened for it upon deenergization of the pilot valve.

The objects of the invention are to attain the above results, and more particularly to obtain them with a very simple single changeable part that may be readily changed in the field without requiring any major changes in the valve itself.

Further objects include providing a valve construction with a main valve adapted to be opened upon either energization or deenergization of an external control means, with a simple and single changeable part for selecting which condition prevails.

In the drawing:

Fig. 1 is a vertical medial section through the valve;

Fig. 2 is a similar view of the lower part of the valve taken at 90° from Fig. 1;

Fig. 3 is a view of one side of the selector plate;

Fig. 4 is a view of the other side; and

Fig. 5 is a sectional view on the line 5—5 of Fig. 4.

The valve includes a main lower body section 10 and an upper section 11. The lower section has a first passage A leading thereinto and a second passage B leading thereinto, which two passages, though for convenience generally designated inlets, may be either inlets or exhausts, as will be described. There is also an outlet passage C leading from the valve body 10.

A port 13 within the body member 10 leads from the passage A to the passage C and has a valve seat member 14 therein. A similar port 15 is formed in a valve seat insert 16 threaded in the body to establish communication between the passage B and the outlet C. The two valve seats 14 and 16 are, for greatest simplicity, directly opposite.

A two-way valve 17 secured to a valve stem 18 alternately operates against either the valve seat 14 or the valve seat 16.

The valve stem 18 extends upwardly within the body member 10 and receives at its upper end a self-centering collar 20 having a nut 21 to secure it in position. The self-centering member receives a spherical washer 22 disposed within a cylindrical chamber 23. A coil spring 24 engages the washer 22 and the bottom of the chamber 23 to urge the washer, the valve stem, and the valve upwardly. An upstanding boss 25 rises from the bottom of the chamber 23 to contain a packing gland 27 that serves to seal the chamber 23 from the inlet A and also to guide the valve stem.

The spring 24 urges the valve stem 18 upwardly against a buffer plate 30 which, in turn, is forced against a diaphragm 31 clamped between the lower section 10 and the upper section 11 of the valve. The chamber 23 in the lower member 11 includes the space below the diaphragm, about the buffer plate 30. The upper valve member 11 provides an upper diaphragm chamber 32, adapted to receive fluid under pressure.

To provide varying fluid pressures and to control the same for operation of the diaphragm, there are plurality ports within the valve body members. On one side of the valve member 10, there is provided a flat surface 35 (Fig. 1). From the inlet passage A there leads a port 36 to the surface 35. From the inlet B there leads a port 37 to the surface 35. From the chamber 23 there leads a port 38 to the surface 35. From the surface 35 there also leads a port 39 to the upper edge of the lower body member 10. This port 39 registers with a port 41 in the upper member 11. This port leads to an enlarged passage 42 closed by a cap 43. Within the passage 42, there is disposed a strainer 44 on a threaded insert 45.

The passage 42 leads to a control valve chamber 47 that, in turn, has a passage 48 leading from it to the upper diaphragm chamber 32. A valve seat insert 49 is disposed within the passage 48. A valve 50 is adapted to control the passage 48. The valve 50 has a reduced valve stem 52 with an enlarged head 53 thereon. A sleeve 54 of magnetic material slides along the valve stem within the limits of the valve 50 and the head 53. This sleeve is contained within a vertical core passage 55 around which there is a coil 56 having suitable leads, not shown, for connection with an electric circuit. A stop member 57 limits the upward movement of the valve.

The magnetic operating means is secured to a short sleeve member 60 adapted to be attached to the upper valve member 11 by a union 61. It will be seen that upon energization of the coil 56, the armature sleeve 54 is raised so that it attains a momentum at the time it strikes the head 53 and thereafter rapidly lifts the valve. Upon deenergization of the magnet, the valve again falls to closed position under the influence of gravity.

There is a bleeder passage between the chamber 32 and the chamber 23. This passage originates in a combined bleeder port and valve insert 65 leading to a port 66 that turns and terminates at the bottom surface of the upper member 11. A continuation port 67 in the lower valve member 10 carries this port 66 into the upper part of the chamber 23.

The member 65 receives a valve 70 consisting, for example, of a sheet of plastics or similar material that is attached to a spring blade 71, the other end of which is secured to the member 11. The spring 71 urges the valve 70 against the insert 65 to close the passage 66. However, the member 70 extends over beneath the passage 48 where it receives an end of a pin 72 extending from the valve 50 so that when the valve 50 is in its lower position, the valve 70 is held open.

To control the several passages, a selector plate 75 is secured against the surface 35. The selector plate shown has two working surfaces, each of which has grooves in it. The surface A (Fig. 4), designed to make passage A the inlet, has a groove 76 that is adapted to register with the ends of the ports 36 and 39. It has an additional groove 77 adapted to register with the ports 37 and 38. In Fig. 1, the selector plate 75 is shown with the surface A against the surface 35.

The opposite side B of the selector plate has (Fig. 3) a first groove 79 adapted to register with the ports 39 and 37 and a second groove 80 adapted to register with the ports 36 and 38.

The operation of the device is as follows:

With the selector plate set as shown in Fig. 1, with its surface A against the surface 35, the port A will be the inlet; the port B will be the exhaust; and the port C will be the outlet.

The valve 50 is adapted to be operated by any suitable mechanism, for instance, a thermostat circuit, not shown. At the start, it will be assumed to be deenergized, so that the valve 50 is closed. The passage A hence receives pressure which goes through the passage 13 but stops at the valve 17 which is held closed against the seat 14 by the spring 24. Likewise, pressure would pass from the passage A through the port 36, the groove 76, the port 39, the port 41, and to the chamber 47 whence it is stopped by the valve 50. At this time, the upper diaphragm chamber 32 is in communication through the bleeder port 65 and the ports 66 and 67 with the chamber 23 which, in turn, is in communication through the port 38, the groove 77, and the port 39 to the passage B to exhaust. Under these circumstances, the spring 24 has sufficient force to elevate valve 17 against the diaphragm so that it closes against the valve seat 14.

When the external means energizes the coil 56, it opens the valve 50 by lifting the armature 54. When this occurs, the pressure within the chamber 47 then passes through the port 48 into the upper diaphragm chamber 32. Lifting of the valve 50 also permits closure of the bleeder valve 70. Pressure then builds up within the diaphragm chamber 32 greater than the force of the spring 23, so that the diaphragm acting against the buffer plate 30 forces the valve 17 down and permits the main flow of the fluid under pressure from the passage A through the passage 13 to the outlet C. When the valve 17 moves downwardly, it also seats against the valve seat 16 so that the exhaust B is out of direct communication with the inlet A. This condition will maintain so long as the coil 56 is energized.

Upon subsequent deenergization of the coil 56, the valve 50 will again close, and in doing so will open the valve 70. The valve 50 then again cuts off the pressure 32 above the diaphragm but the bleeder passage is open so that the trapped gas under pressure may bleed out therethrough to the chamber 23 and ultimately to the exhaust B as previously described. Relieving this pressure in the chamber 32 permits the spring 24 to shift the valve 17 from its seat 16 to the seat 14 and the mechanism returns to starting position.

By the simple expedient of reversing the selector plate 75 the valve may be caused to open upon deenergization of the coil 56. With the reversal of the selector plate 75, the passage B becomes the inlet, the passage A the exhaust, and the passage C the outlet as before. There will, therefore, be pressure in the passage B which stops at the valve 17, because the same is closed against the seat 16. However, this pressure is transmitted through the port 37 to the surface 35, whence by way of the groove 79 it passes to the port 39 and thence ultimately to the chamber 48. As has been set forth, under these conditions the coil is energized with the mechanism at rest. Hence, the valve 50 is open, so that the gas under pressure within the chamber 47 flows through the port 48 into the upper diaphragm chamber 42. The valve 70 is closed so that the pressure within the chamber 32 overcomes the force of the spring 24 and maintains the valve 17 closed against the seat 16.

Upon subsequent release of the coil 56, the valve 50 will close and in so doing, open the valve 70. This cuts off the gas under pressure from the chamber 32, which then bleeds out through the bleeder 65 into the chamber 23 and thence, by port 38, to the surface 35. At this point, it meets the groove 80 and flows therethrough to the port 36 and into the passage A which is now exhaust. Relief of this pressure within the upper diaphragm chamber 32 permits the spring 24 to lift the valve 17 from its seat 16 and to seat it against the seat 14, thus establishing flow from the inlet B to the outlet C and breaking direct communication to the exhaust passage A.

When the external control means then subsequently energizes the coil 56, the valve 50 will be raised. This, of course, causes closing of the valve 70. Owing to the fact that fluid under pressure then may flow through the port 37, the port 39, the port 41, the chamber 40, the passage 48 to the upper diaphragm chamber 32, and because it cannot escape through the bleeder port, pressure builds up within the chamber 32 to overcome the spring 24 and to shift the valve 17 from its seat 14 to the seat 16 again to close the main valve and to establish the starting position.

The force of the spring 24 is adjustable by rotating the valve stem 18 by a screw-driver projecting through the passage B, so that the valve may be closed to operate at the proper pressure conditions.

It will be seen that a three-way valve has been provided which, by a very simple operation, can be made to provide flow from an inlet to an outlet either upon energization of a control valve mechanism or upon deenergization thereof.

What is claimed is:

1. In a mechanism of the kind described, a valve body, means to establish flow through the body including a main valve in said body, means to open said valve, control means to effect opening of the valve, said control means including an energizable means, and a selector on the valve body selectively to determine whether the control means opens the valve or closes the same upon energization of said energizable means.

2. In a mechanism of the kind described, a valve body, means to establish and cut off flow through the body including a main valve, pressure responsive means including a pressure chamber, to operate the main valve in response to fluid pressure in said chamber, fluid pressure and exhaust conduits leading into and from said chamber, a second valve controlling one of said fluid pressure conduits, energizable means to operate said valve, and selector means in said conduits controlled to determine whether the fluid pressure means operates to open the main valve upon energization of said energizable means, or deenergization thereof, to establish flow through the body.

3. In a mechanism of the kind described, a valve body having a surface and an outlet and first and second passages, both said passages communicating with the outlet, a valve seat between each passage and the outlet, valve means movable to seat on either valve seat, fluid pressure means including a fluid pressure chamber to operate the valve from first to second position in response to fluid pressure in the chamber, said valve body having a port leading from each passage to the surface, an inlet port leading from the surface to the pressure chamber, and an outlet port leading from the surface to the chamber, a control valve interposed in the inlet port, means energizable to shift the control valve from one position to another, in one of which positions it closes the port, said valve being adapted for use with selector means on said surface to determine which passage port shall be connected with the inlet port and the other to the outlet port, the selection providing whether the valve shall establish flow to the outlet when the control means is energized or deenergized.

4. In a mechanism of the kind described, a valve body having an outlet and a first and a second passage communicating therewith, a valve seat between each passage and the outlet, a valve operable from one seat to the other, fluid pressure means for operating the valve including a pressure chamber, said pressure means being adapted to seat the valve against one seat upon existence of fluid under pressure in the chamber, and to seat it against the other seat upon release of said fluid pressure, said body having a selector plate area thereon, a port leading from each passage to the surface, an inlet port leading from the surface to the pressure chamber, an exhaust port leading from the surface to the chamber, a control valve in the inlet port, means energizable to displace the control valve, and deenergizable to release the control valve, and said valve being adapted for use with selector means to engage said surface of the body, said selector means being adapted to select either port from the passages to connect the same to the inlet port, and to select the other port from the passage to the exhaust port, whereby to determine whether the energization of the control valve or the deenergization thereof will cause flow of fluid through the valve body.

5. In a mechanism of the kind described, a valve body, an outlet therein, first and second passages, each connecting with the outlet, a valve seat between each passage and the outlet, a valve adapted alternately to seat on one valve seat and to open the other, fluid pressure means to shift the valve from the first seat to the second, the body providing a pressure chamber above the pressure means, inlet fluid conduits leading from each passage to the pressure chamber, an exhaust conduit from the pressure chamber, a cut-off for controlling said inlet conduits, energizable and releasable means to operate the cut-off, and said valve being adapted for use with selector means to connect one passage to the inlet conduit and the other to the exhaust conduit for causing opening of the valve from one of said passages when the cut-off opening means is operated, and said selector means being also adapted to connect the other passage to the inlet conduit and the one to the exhaust for causing opening of the valve when the cut-off opening means is released.

6. In a valve mechanism, three passages, the first being an outlet, and the second and third being connected with the first, opposed valve seats, one between the first or outlet passage and each of the second and third passages, a valve displaceable from one valve seat to the other, to select which of the second and third passages shall communicate with the first, and to cut off the other, fluid pressure responsive means to displace the valve, an additional control valve, said valve body having a surface thereon, a first port leading from the second passage to the surface, a second port leading from the surface to the control valve, a third port leading from the third passage to the surface, and a fourth port leading from the pressure responsive means to the surface, and said valve being adapted for use with selector means adapted to cause registry between the first and second ports, and between the third and fourth ports, and adapted also alternately to cause registry between the third and second ports, and between the first and fourth ports, and said additional control valve being adapted to admit or to cut off fluid pressure from the second port to the pressure responsive means, and the selector means being adapted to determine whether the main valve can admit pressure flow from the second passage to the first when the additional control valve is open, or the main valve can admit pressure flow from the third passage to the first when the additional control valve is closed.

7. In a mechanism of the kind described, a valve body having a common passage and first and second passages therein, both of said latter passages communicating with the common passage, a pressure chamber in the valve body, a pressure line and an exhaust line from the pressure chamber, a pressure port from each passage, a movable member adapted to be displaced by pressures in the pressure chamber, valve means adapted to be operated by the movable member to close communication of the first passage with the common passage while opening communication of the second passage with said common, upon increase of pressure in the pressure chamber, and vice versa upon decrease of pressure in the pressure chamber, said valve body being adapted for use with selector means to selectively connect the pressure line into a chosen one of the pressure ports, and a control valve in said pressure line adapted to open to admit pressure to the pressure chamber.

8. In a mechanism of the kind described, a valve body having a common passage and first and second passages therein, both communicating with the common passage, a pressure chamber in the valve body, a pressure line and an exhaust line from the pressure chamber, a pressure port and an exhaust port from each passage, said valve body being adapted for use with selector means adapted to selectively connect the pressure port for one of the passages with the pressure line and the exhaust port for the other passage with the exhaust line, a movable member adapted to be displaced by pressures in the pressure chamber, valve means adapted to be operated by the movable member to close communication of the first passage with the common passage while opening communication of the second passage with said common, upon increase in pressure in said pressure chamber, and vice versa upon decrease in pressure in the pressure chamber, and a control valve in the pressure line adapted to open to admit pressure to the pressure chamber.

9. In a mechanism of the kind described, a valve housing having a first, a second, and a third port, a first valve seat between the first and third ports, a second valve seat between the second and third ports, a main valve adapted for cooperation with either valve seat, whereby when it occupies the first valve seat, it cuts off the first port from the third and permits communication between the second and third ports, and when it occupies the second seat, it cuts off the second port and permits communication between the fisrt and third ports, a pressure-responsive means to operate the main valve, a pressure chamber for said means adapted to receive pressure and displace said means to cause the main valve to seat on the second seat, and upon release of pressure to permit the main valve to seat upon the first seat, a pilot passage leading from the pressure chamber and adapted to be connected to one of said first two ports, a pilot valve adapted to control said passage, a second passage leading from the first port to adjacent the pilot passage, a third passage leading from the second port to adjacent the pilot passage, whereby when said second passage is connected to the pilot passage and the first port is connected to a source of pressure, the main valve will be caused to open said first port to the third port upon opening of the pilot valve, and when the third passage is connected to the pilot passage and the second port to the source of pressure, the main valve will be caused to open said second port to the third port upon closing of the pilot valve.

JOHN E. DUBE.